United States Patent
Oshikane et al.

(10) Patent No.: US 10,857,839 B2
(45) Date of Patent: *Dec. 8, 2020

(54) TIRE

(71) Applicant: BRIDGESTONE CORPORATION, Tokyo (JP)

(72) Inventors: Keita Oshikane, Tachikawa (JP); Nobuyuki Hirai, Kodaira (JP); Takashi Kuwahara, Higashiyamato (JP); Kentaro Mizotani, Kodaira (JP); Yuki Nakamura, Hikone (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1010 days.

This patent is subject to a terminal disclaimer.

(21) Appl. No.: 14/891,787

(22) PCT Filed: Apr. 21, 2014

(86) PCT No.: PCT/JP2014/002244
§ 371 (c)(1),
(2) Date: Nov. 17, 2015

(87) PCT Pub. No.: WO2014/207976
PCT Pub. Date: Dec. 31, 2014

(65) Prior Publication Data
US 2016/0121661 A1    May 5, 2016

(30) Foreign Application Priority Data

Jun. 24, 2013 (JP) .................. 2013-131911

(51) Int. Cl.
*B60C 13/04* (2006.01)
*B60C 13/00* (2006.01)

(52) U.S. Cl.
CPC .......... *B60C 13/001* (2013.01); *B60C 13/002* (2013.01); *B60C 13/04* (2013.01)

(58) Field of Classification Search
CPC ..... B60C 13/04; B60C 13/001; B60C 13/002; B60C 13/00; Y10S 152/12
(Continued)

(56) References Cited

U.S. PATENT DOCUMENTS 6,224,958 B1 * 5/2001 Mahn, Jr. ............. B60C 13/001
6,235,376 B1 * 5/2001 Miyazaki
(Continued)

FOREIGN PATENT DOCUMENTS

EP        0691223 A2      1/1996
EP     1 073 031 A1 *    1/2001    ........... B60C 13/001
(Continued)

OTHER PUBLICATIONS

English translation of the Written Opinion of the International Searching Authority, Form PCT/IB/373, dated Dec. 29, 2015 in corresponding international application PCT/JP2014/002244.*
(Continued)

*Primary Examiner* — Adrienne C. Johnstone
(74) *Attorney, Agent, or Firm* — Kenja IP Law PC

(57) ABSTRACT

A tire 10 has a decoration portion 15 using a paint on a surface of a side portion 12. The decoration portion 15 has a white paint layer 16 formed on at least a part of the decoration portion 15, a color paint layer 17 disposed by laminating on the white paint layer 16 and having a thickness less than the thickness of the white paint layer 16, and a protective layer 18 disposed by laminating on the color paint layer 17 and having the thickness less than the thickness of the white paint layer 16. The elastic modulus of the protective layer is larger than the elastic modulus of the white paint layer and the color paint layer. A thickness of the decoration portion 15 as a whole, including the white paint layer 15, the color paint layer 17 and the protective layer 18, is 150 μm or less.

16 Claims, 1 Drawing Sheet

(58) Field of Classification Search
USPC .......................................... 152/524, DIG. 12
See application file for complete search history.

(56) References Cited

U.S. PATENT DOCUMENTS

| | | | |
|---|---|---|---|
| 6,391,134 B1 | 5/2002 | Lipovac | |
| 7,153,381 B2* | 12/2006 | Majumdar | ............ B60C 13/001 |
| 10,040,321 B2* | 8/2018 | Amano | ................... B60C 13/04 |
| 2014/0338809 A1* | 11/2014 | Nakamura | ............ B60C 13/001 |
| | | | 152/524 |
| 2015/0273953 A1* | 10/2015 | Kotsubo | ................. B32B 25/14 |
| | | | 428/335 |

FOREIGN PATENT DOCUMENTS

| | | | | |
|---|---|---|---|---|
| JP | 52040100 A | * | 3/1977 | |
| JP | H10-86605 A | | 4/1998 | |
| JP | 2002244561 A | * | 8/2002 | |
| JP | 2005178638 A | * | 7/2005 | |
| JP | 2007-210378 A | | 8/2007 | |
| JP | 2007212945 A | * | 8/2007 | |
| JP | 2012-176682 A | | 9/2012 | |
| JP | 2012-250575 A | | 12/2012 | |
| WO | WO 2013/099103 A1 | * | 7/2013 | |
| WO | WO-2014/068998 A1 | * | 5/2014 | |
| WO | WO-2014/203444 A1 | * | 12/2014 | |

OTHER PUBLICATIONS

English machine translation of JP 2012-176682 A, dated Sep. 13, 2012.*
English machine translation of JP 52-40100 A, dated Mar. 28, 1977.*
English machine translation of JP 2002-244561 A, dated Aug. 30, 2002.*
English machine translation of JP 2005-178638 A, dated Jul. 7, 2005.*
English machine translation of JP 2007-212945 A, dated Aug. 23, 2007.*
Jul. 22, 2014, International Search Report issued in International Patent Application No. PCT/JP2014/002244.
Nov. 19, 2013, Notification of Reasons for Refusal issued by the Japan Patent Office in the corresponding Japanese Patent Application No. 2013-131911.

* cited by examiner

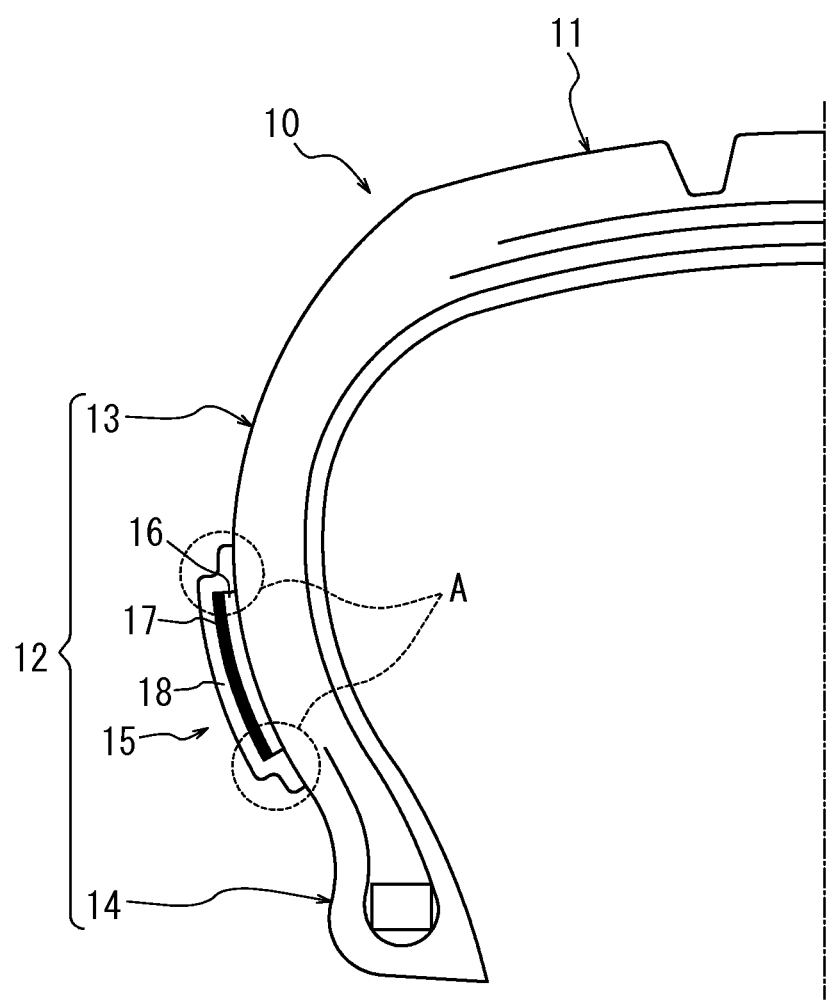

TIRE

CROSS-REFERENCE TO RELATED APPLICATION

This application claims priority to and the benefit of Japanese patent application No. 2013-131911 filed on Jun. 24, 2013, the entire contents of which is incorporated herein by reference.

TECHNICAL FIELD

This disclosure relates to a tire.

BACKGROUND

Conventionally, a marking or decoration is applied on a surface of a side portion of a tire by using a paint. A paint probably suffer deterioration or loss due to external friction and impact. Then, it is suggested to cover the paint layer with a protective layer to thereby protect the paint layer (see PTL 1).

CITATION LIST

Patent Literature

PTL1: JP2012-176682A

SUMMARY

Technical Problem

In the aforementioned tire, since a base color of the tire is black, the paint layer is darkened and the coloring thereof is relatively deteriorated. Therefore, improvement in coloring is desired. Moreover, in order to obtain a required resistance to external damage by using the aforementioned protective layer, it is necessary to render the protective layer necessarily have a certain hardness. However, the harder the protective layer, the higher the probability that a crack occurs in a protective layer of a travelling tire due to side portion distortion. In particular, if the coloring is improved, the distortion becomes larger due to the thickness between the tire and the protective layer. Therefore, the probability of crack occurrence is further increased. For this reason, improvement in coloring, and excellent resistance to external damage and resistance to crack are desired simultaneously.

Therefore, this disclosure, which is made in consideration of such matters, aims to provide a tire having a decoration portion with improved coloring and excellent resistance to external damage and resistance to crack.

Solution to Problem

In order to solve the aforementioned problems, the tire of this disclosure has a decoration portion using a paint on a surface of a side portion, the decoration portion having a white paint layer disposed on at least a part of the decoration portion, a color paint layer having a thickness lower than a thickness of the white paint layer and being disposed by laminating on an outer side in the tire width direction of the white paint layer, and a protective layer having a thickness lower than the thickness of the white paint layer, an elastic modulus higher than both the white paint layer and the color paint layer and being disposed by laminating on an outer side in the tire width direction of the color paint layer, a thickness of the decoration portion, including the white paint layer, the color paint layer and the protective layer, being 150 μm or less. Further, the thickness of the decoration portion as a whole and the thickness of the protective layer refer to each thickness at a maximum thickness position within the decoration portion. According to such configuration, the coloring of the color paint layer is improved, and it becomes possible to improve the decorative property and obtain both resistance to external damage and resistance to crack.

Moreover, in the tire of this disclosure, it is preferable that an elastic modulus of the protective layer is $1 \times 10^7$ or more to $1 \times 10^8$ Pa or less. Further, the elastic modulus is a value measured according to JIS K7244-4 (ISO 6721-4) "*Tensile Vibration*". According to this configuration, it is possible to obtain sufficient resistance to external damage and resistance to crack.

Moreover, in the tire of this disclosure, it is preferable that at least a part of the protective layer is disposed by laminating on the side portion without interposition of the white paint layer and the color paint layer, and the thickness of the protective layer is preferable 10% or more of the thickness of the decoration portion as a whole. According to this configuration, it is possible to suppress occurrence of crack at a border between a region configured merely with the protective layer and a region configured with other layers as well in the decoration portion.

Moreover, in the tire of this disclosure, it is preferable that the thickness of the protective layer is 20 μm or less. According to this configuration, it is possible to obtain sufficient resistance to crack.

Moreover, in the tire of this disclosure, it is preferable that the thickness of the protective layer is 30% or less of a paint thickness in total of the white paint layer and the color paint layer. According to this configuration, it is possible to obtain sufficient resistance to crack. Further, comparison of the thickness of the protective layer and the paint thickness is made with respect to a thickness at a random point on the decoration portion.

Moreover, in the tire of this disclosure, it is preferable that the thickness of the decoration portion as a whole is 95 μm or less. According to this configuration, it is possible to obtain sufficient resistance to crack.

Advantageous Effect

According to this disclosure configured as mentioned above, it is possible to provide tire having a decoration portion with improved coloring and excellent resistance to external damage and resistance to crack.

BRIEF DESCRIPTION OF THE DRAWINGS

In the accompanying drawings:

FIG. 1 is a cross-sectional diagram in the tire width direction of the tire according to this disclosure.

DETAILED DESCRIPTION

Hereinafter, an embodiment of this disclosure will be described with reference to the drawing.

First, a tire according to an embodiment of this disclosure is described. FIG. 1 is a cross-sectional diagram in the tire width direction of the tire according to this embodiment. As illustrated in FIG. 1, tire 10 includes a tread portion 11 and a side portion 12. The tread portion 11 contacts the road surface. The side portion 12 includes a sidewall portion 13 and a bead portion 14. More specifically, the side portion 12 is a portion within a range from an end edge of outer side in a tire width direction of the tread surface to a rim fitting portion of the bead portion 14.

The tire 10 of this embodiment has a decoration portion 15 on the side portion 12. The decoration portion 15 displays a marking, a decoration and the like by using a paint of white color or other colors. The decoration portion 15 includes on at least a part thereof a white paint layer 16, a color paint layer 17 laminated thereon, and a further laminated protective layer 18. The decoration portion 15 may be in a manner of continuous or intermittent along a circumferential direction of the side portion 12, or in a manner partially formed on the side portion 12. Further, the decoration portion 15 may have a configuration either including only a part formed by laminating the white paint layer 16, the color paint layer 17 and the protective layer 18, or including such part in a part thereof. The thickness of the decoration portion 15 as a whole, including the white paint layer 16, the color paint layer 17 and the protective layer 18, is necessarily 150 μm or less, preferably 95 μm or less. Further, the thickness of the decoration portion 15 as a whole refers to a thickness at a maximum thickness position within the side portion 12. Further, in FIG. 1, for the sake of easiness to understand, illustrated is a mode in which the white paint layer 16, the color paint layer 17 and the protective layer 18 have exaggerated thicknesses.

The white paint layer 16 is disposed on at least a part of the decoration portion 15 by, e.g., printing a white paint. The white paint layer 16 may be directly formed or may be formed via such as primer, on the surface of the side portion 12.

The color paint layer 17 is disposed by laminating a color paint having a color different form the white paint by, e.g., printing, on at least a part of the outer side in tire width direction of the white paint layer 16. Moreover, as for the color paint layer 17, the thickness of the color paint layer 17 is necessarily less than the thickness of the white paint layer 16. Further, the thicknesses of the color paint layer 17 and the white paint layer 16 refer to each thickness at a maximum thickness position within the decoration portion 15. Further, for example, a marking, a decoration and the like are applied on the white paint layer 16 by using the color paint layer 17. Further, the white paint layer 17 may be directly formed or may be formed via such as other layer, on the surface of the side portion 16.

In this embodiment, the white paint and the color paint are a UV ink which contain as primary components, e.g., a photopolymerization initiator, oligomer, monomer or coloring agent, and may be optionally compounded with ultraviolet absorber, antioxidant, photostabilizer, adhesion promoter, rheology adjusting agent, dispersant and the like.

The protective layer 18 is disposed by laminating on at least an outer side in the tire width direction of the color paint layer 17, by using a transparent material such as OP varnish, aqueous urethane resin and the like. Further, it is preferable that at least a part of the protective layer 18 is disposed on the surface of the side portion 12 in a manner exceeding an outer edge where the white paint layer 16 is formed, without interposition of the white paint layer 16 and the color paint layer 17 (see the reference sign "A"). Moreover, the thickness of the protective layer 18 is necessarily less than the thickness of the white paint layer 16, and is preferably 10% or more of the thickness of the decoration portion 15 as a whole when disposed on the surface of the side portion 12 without interposition of the white paint layer 16 and the color paint layer 17, is preferably 20 μm or less, and is preferably 30% or less of the paint thickness in total of the white paint layer 16 and the color paint layer 17. Further, the thickness of the protective layer 18 and the paint thickness refer to thicknesses at the maximum thickness position within the decoration portion 15. Moreover, the elastic modulus of the protective layer 18 is necessarily larger than the elastic modulus of either the white paint layer 16 or the color paint layer 17, and is preferably $1 \times 10^7$ Pa or more to $1 \times 10^8$ Pa or less. Further, the elastic modulus a value measured according to JIS K7244-4 (ISO 6721-4) "Tensile Vibration".

According to the tire of this embodiment having the aforementioned configuration, since the thickness of the decoration portion 15 as a whole is 150 μm or less, it is possible that the decoration portion 15 as a whole obtains tracking to deformation of the side portion 12, and the decoration portion 15 obtains excellent resistance to crack with respect to assumed distortion of the side portion 12. Moreover, according to the tire of this embodiment, as mentioned above, since the thickness of the white paint layer 16 is larger than the thickness of the color paint layer 17 and the protective layer 18, it is possible to render the white paint layer 16 having an elastic modulus lower than the protective layer 18 distortion occurring in the side portion 12. Moreover, due to interposition of the color paint layer 17 between the white paint layer 16 and the protective layer 18, it is possible to greatly suppress the effect of distortion of the protective layer 18. Therefore, it is possible to use a material having the elastic modulus capable of achieving the required resistance to external damage to the protective layer 18, and simultaneously, the protective layer 18 is capable of obtaining the required resistance to crack with respect to assumed distortion of the side portion 12. According to the aforementioned combination of effects, the decoration portion 15 is capable of having both excellent resistance to external damage and excellent resistance to crack. Moreover, according to the tire of this embodiment, since the color paint layer 17 is disposed by laminating on the white paint layer 16, comparing to a configuration directly forming the color paint layer 17 on the side portion 12, it is possible to improve the coloring of the color paint layer 17.

Moreover, by setting the thickness of the white paint layer 16 to be larger than the thickness of the white paint layer 17, it is possible to improve the coloring and the decorative property of the color paint layer 17.

Moreover, by setting the elastic modulus the protective layer 18 to be $1 \times 10^7$ Pa or more, it is possible to obtain sufficient resistance to external damage. Moreover, by setting the elastic modulus the protective layer 18 to be $1 \times 10^8$ Pa or less, it is possible to obtain sufficient resistance to crack.

Moreover, by setting the thickness of the protective layer 18 to be 10% or more of the thickness of the decoration portion 15 as a whole when the protective layer 18 is disposed on the surface of the side portion 12 without interposition of the white paint layer 16 and the color paint layer 17, it is possible to suppress occurrence of crack at the border position described in the following. Within the decoration portion 15, if the difference in thickness is too large between a region configured merely with the protective layer 18 and a region configured with other layers (the white paint layer 16 and the color paint layer 17) as well, the probability of occurrence of crack at a border position between the two regions is increased. For this reason, according to this embodiment, by setting an upper limit of the difference in thickness, it is possible to suppress the occurrence of crack at the border position. Moreover, by disposing the protective layer 18 on the surface of the side portion 12 without interposition of the white paint layer 16 and the color paint layer 17, it becomes possible to sufficiently protect the white paint layer 16 and the color paint layer 17.

Moreover, by setting the thickness of the protective layer 18 to be 20 μm or less, distortion to the protective layer 18 is further suppressed, and the deformation volume due to distortion of the protective layer 18 is suppressed. Accordingly, it is possible to obtain sufficient resistance to crack.

Moreover, by setting the thickness of the protective layer 18 to be 30% or less of the paint thickness, it is possible to further suppress concentration of distortion to the protective layer 18. Therefore, the deformation volume of distortion of the protective layer 18 itself is further suppressed. Accordingly, it is possible to obtain sufficient resistance to crack.

Moreover, by setting the thickness of the decoration portion 15 as a whole to be 95 μm or less, the decoration portion 15 as a whole obtains tracking to deformation of the side portion 12, and a sufficient resistance to crack is obtained.

EXAMPLES

Next, tires according to the present disclosure were produced, and the resistance to crack, the resistance to external damage and the coloring were evaluated, as described below. With the specifications as shown in Table 1, produced were tires having a tire size of 195/65R15 according to Comparative Examples 1 to 3 and Examples 1 to 11, in which a white paint layer 16 and a color paint layer 17 were disposed by using a white paint and a color paint of UV curable ink (made by Miyama Co., Ltd.), and a protective layer was disposed by using an aqueous urethane resin. With respect to the tires of Comparative Examples 1 to 3 and the tires of Examples 1 to 11, resistance to crack, resistance to external damage and coloring were evaluated with the following methods. The results are as shown in Table 1.

(Resistance to Crack Evaluation Test)

The tires of Comparative Examples 1 to 3 and Examples 1 to 11 were mounted to a rim of size 6JJ (a standard rim of JATMA standard), applied an air pressure of 240 kPa (a maximum air pressure of JATMA standard), and subjected to a drum test over 10000 km (10000 km test) at a drum speed of 60 km/h, loading a drum load of 615 kg (a JATMA maximum load). Moreover, a drum test over 30000 km (30000 km test) was performed at same conditions as the 10000 km test. After loading the drum load, the resistance to crack was evaluated by judging via visual observation, respectively for the 10000 km test and the 30000 km test, whether a crack exists in laminating parts of the white paint layer 16 and the color paint layer 17. The evaluation results are as shown in Table 1. Further, the required resistance to crack is a performance that no crack occurs in the 10000 km test.

(Resistance to External Damage Evaluation Test)

A resistance to external damage test (20-time coin test) was performed by scratching with a coin for 20 times the decoration portion 15 of the tires of Comparative Example 1 to 3 and Examples 1 to 11. Moreover, the resistance to external damage test (100-time coin test) was performed by scratching with a coin for 100 times. After scratching with a coin, the resistance to external damage was evaluated by judging via visual observation whether an external damage occurred in the decoration portion 15. The evaluation results are shown in Table 1. Further, the required resistance to external damage is a performance that no external damage occurs in the 20-time coin test.

(Coloring Evaluation Test)

The coloring was evaluated by observing the tires of Comparative Examples 1 to 3 and Examples 1 to 11 by 20 observers, and aggregating a questionnaire graded on 3 steps with respect to the coloring of the color paint layer 17. The evaluation results are as shown in Table 1. In Table 1, the coloring of the examples were evaluated as C if evaluated as excellent in the questionnaire graded on 3 steps by less than 10 observers among the 20, as B if by 10 or more and less than 15, and as A if by 15 or more. Further, the required coloring is a performance evaluated as A or B.

TABLE 1

| | Comparative Example 1 | Comparative Example 2 | Comparative Example 3 | Example 1 | Example 2 | Example 3 | Example 4 |
|---|---|---|---|---|---|---|---|
| Decoration portion thickness [μm] | 60 | 160 | 60 | 60 | 150 | 95 | 60 |
| Protective layer thickness [μm] | 10 | 27 | 30 | 10 | 25 | 16 | 10 |
| Protective layer thickness/decoration portion thickness [%] | 17 | 17 | 50 | 17 | 17 | 17 | 17 |
| Protective layer thickness/paint thickness [%] | 20 | 20 | 100 | 20 | 20 | 20 | 20 |
| Presence of white paint layer | Absent | Present | Present | Present | Present | Present | Present |
| Comparison of white paint layer thickness (*1) | Small | Small | Large | Small | Small | Small | Small |
| Protective layer elastic modulus [Pa] | $5 \times 10^7$ | $5 \times 10^7$ | $5 \times 10^7$ | $5 \times 10^7$ | $5 \times 10^7$ | $5 \times 10^7$ | $9 \times 10^6$ |
| Presence of 10000-km test crack | Absent | Present | Present | Absent | Absent | Absent | Absent |
| Presence of 30000-km test crack | Absent | Present | Present | Absent | Present | Absent | Absent |
| 20-time coin test | Absent | Absent | Absent | Absent | Absent | Absent | Absent |
| 100-time coin test | Absent | Absent | Absent | Absent | Absent | Absent | Present |
| Coloring | C | A | A | A | A | A | A |

| | Example 5 | Example 6 | Example 7 | Example 8 | Example 9 | Example 10 | Example 11 |
|---|---|---|---|---|---|---|---|
| Decoration portion thickness [μm] | 60 | 60 | 60 | 60 | 60 | 60 | 60 |
| Protective layer thickness [μm] | 10 | 10 | 10 | 20 | 25 | 6 | 5 |
| Protective layer thickness/decoration portion thickness [%] | 17 | 17 | 17 | 33 | 42 | 10 | 8 |
| Protective layer thickness/paint thickness [%] | 20 | 20 | 20 | 50 | 71 | 11 | 9 |

TABLE 1-continued

| | | | | | | | |
|---|---|---|---|---|---|---|---|
| Presence of white paint layer | Present | Present | Present | Present | Present | Present | Present |
| Comparison of white paint layer thickness (*1) | Small | Small | Small | Small | Small | Small | Small |
| Protective layer elastic modulus [Pa] | $5 \times 10^7$ | $1 \times 10^8$ | $2 \times 10^8$ | $5 \times 10^7$ | $5 \times 10^7$ | $5 \times 10^7$ | $5 \times 10^7$ |
| Presence of 10000-km test crack | Absent | Absent | Absent | Absent | Absent | Absent | Absent |
| Presence of 30000-km test crack | Absent | Absent | Present | Absent | Present | Absent | Present |
| 20-time coin test | Absent | Absent | Absent | Absent | Absent | Absent | Absent |
| 100-time coin test | Absent | Absent | Absent | Absent | Absent | Absent | Absent |
| Coloring | A | A | A | A | A | A | A |

The "*1" in Table 1 shows "small" when the thicknesses of both the color paint layer 17 and the protective layer 18 are less than the thickness of the white paint layer 16, and shows "large" when at least one is more than the thickness of the white paint layer 16.

As shown in Table 1, in Examples 1 to 11, no crack occurred in the 10000 km test. On the other hand, in Comparative Examples 2 and 3, a crack occurred in the 10000 km test. Therefore, if the thicknesses of both the color paint layer 17 and the protective layer 18 are less than the thickness of the white paint layer 16 and the thickness of the decoration portion 15 as a whole is 150 μm or less, it is understood that the resistance to crack is sufficient. Moreover, in Examples 1, 3 to 6, 8 and 10, no crack occurred in the 30000 km test. On the other hand, since a crack occurred in the 30000 km test in Example 7, it is understood that the resistance to crack is further improved by setting the elastic modulus of the protective layer 18 to be $1 \times 10^8$ Pa or less. Moreover, on the other hand, since a crack occurred in the 30000 km test in Example 11, it is understood that the resistance to crack is further improved by setting the thickness of the protective layer 18 to be 10% of more of the thickness of the decoration portion 15 as a whole. Moreover, on the other hand, since a crack occurred in the 30000 km test in Examples 2 and 9, it is understood that the resistance to crack is further improved by setting the thickness of the protective layer 18 to be 20 μm or less. Moreover, on the other hand, since a crack occurred in the 30000 km test in Example 9, it is understood that the resistance to crack is further improved by setting the thickness of the protective layer 18 to be 30% or less of the paint thickness. Moreover, on the other hand, since a crack occurred in the 30000 km test in Example 2, it is understood that the resistance to crack is further improved by setting the thickness of the decoration portion 15 as a whole to be 95 μm or less.

As shown in Table 1, in Examples 1 to 11, no external damage occurred in the 20-time coin test. Accordingly, it is understood that the decoration portion 15 has the required resistance to external damage by including a protective layer 18. Moreover, in Examples 1 to 3 and 5 to 11, no external damage occurred in the 100-time coin test. On the other hand, since an external damage occurred in the 100-time coin test in Example 4, it is understood that the resistance to external damage is further improved by setting the elastic modulus of the protective layer 18 to be $1 \times 10^7$ Pa or more.

Moreover, as shown in Table 1, it is understood that the coloring is improved in Examples 1 to 11, comparing to Comparative Example 1. Accordingly, it is understood that the decoration portion 15 has an improved coloring by including a white paint layer 16.

REFERENCE SIGNS LIST 10 tire
11 tread portion
12 side portion
13 sidewall portion
14 bead portion
15 decoration portion
16 white paint layer
17 color paint layer
18 protective layer

The invention claimed is:

1. A tire comprising a decoration portion using a paint on a surface of a side portion, wherein:
the decoration portion having a white paint layer disposed on at least a part of the decoration portion, a color paint layer having a thickness lower than a thickness of the white paint layer and being disposed by laminating on an outer side in the tire width direction of the white paint layer, and a protective layer having a thickness lower than the thickness of the white paint layer, an elastic modulus higher than both the white paint layer and the color paint layer and being disposed by laminating on at least an outer side in the tire width direction of the color paint layer, a thickness of the decoration portion, including the white paint layer, the color paint layer and the protective layer, being 150 μm or less.

2. The tire according to claim 1, wherein: the thickness of the decoration portion as a whole is 95 μm or less.

3. The tire according to claim 1, wherein: an elastic modulus of the protective layer is $1 \times 10^7$ or more to $1 \times 10^8$ Pa or less.

4. The tire according to claim 3, wherein: at least a part of the protective layer is disposed by laminating on the side portion without interposition of the white paint layer and the color paint layer, and the thickness of the protective layer is 10% or more of the thickness of the decoration portion as a whole.

5. The tire according to claim 3, wherein: the thickness of the protective layer is 20 μm or less.

6. The tire according to claim 3, wherein: the thickness of the protective layer is 30% or less of a paint thickness in total of the white paint layer and the color paint layer.

7. The tire according to claim 3, wherein: the thickness of the decoration portion as a whole is 95 μm or less.

8. The tire according to claim 1, wherein: at least a part of the protective layer is disposed by laminating on the side portion without interposition of the white paint layer and the color paint layer, and the thickness of the protective layer is 10% or more of the thickness of the decoration portion as a whole.

9. The tire according to claim 8, wherein: the thickness of the protective layer is 20 μm or less.

10. The tire according to claim 8, wherein: the thickness of the protective layer is 30% or less of a paint thickness in total of the white paint layer and the color paint layer.

11. The tire according to claim 8, wherein: the thickness of the decoration portion as a whole is 95 μm or less.

12. The tire according to claim 1, wherein: the thickness of the protective layer is 20 μm or less.

13. The tire according to claim 12, wherein: the thickness of the protective layer is 30% or less of a paint thickness in total of the white paint layer and the color paint layer.

14. The tire according to claim 12, wherein: the thickness of the decoration portion as a whole is 95 μm or less.

15. The tire according to claim 1, wherein: the thickness of the protective layer is 30% or less of a paint thickness in total of the white paint layer and the color paint layer.

16. The tire according to claim 15, wherein: the thickness of the decoration portion as a whole is 95 μm or less.

* * * * *